United States Patent
Chao et al.

(10) Patent No.: US 12,204,767 B2
(45) Date of Patent: Jan. 21, 2025

(54) SYSTEM AND METHOD FOR MANAGING DATA STORAGE TO IDENTIFY UNDESIRED DATA MODIFICATION

(71) Applicant: Dell Products L.P., Round Rock, TX (US)

(72) Inventors: Ching-Yun Chao, Austin, TX (US); Efi Levi, Be'er Sheva (IL); Lior Benisty, Be'er Sheva (IL); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/299,919

(22) Filed: Apr. 13, 2023

(65) Prior Publication Data

US 2024/0345741 A1    Oct. 17, 2024

(51) Int. Cl.
*G06F 3/06* (2006.01)

(52) U.S. Cl.
CPC .......... *G06F 3/0619* (2013.01); *G06F 3/0659* (2013.01); *G06F 3/067* (2013.01)

(58) Field of Classification Search
CPC ....... G06F 3/0619; G06F 3/0659; G06F 3/067
See application file for complete search history.

(56) References Cited

U.S. PATENT DOCUMENTS

| 11,609,906 B1* | 3/2023 | Ghosh | G06F 16/156 |
| 2019/0179536 A1* | 6/2019 | Estrada | H04L 63/123 |
| 2024/0126641 A1* | 4/2024 | Xu | G06F 11/1004 |

OTHER PUBLICATIONS

"What is a Cyclic Redundancy Check", Lenovo, 2024 https://www.lenovo.com/us/en/glossary/cyclic-redundancy-check/?orgRef=https%253A%252F%252Fwww.google.com%252F&srsltid=AfmBOopkBETkwNg7IYHOHtZPhv1eyTaSY0BrqZ-UwZzWnwp0wJtPTAxV (Year: 2024).*

* cited by examiner

*Primary Examiner* — Edward J Dudek, Jr.
(74) *Attorney, Agent, or Firm* — Womble Bond Dickinson (US) LLP

(57) ABSTRACT

Methods and systems for managing data storage are disclosed. The storage of data may be managed by implementing a framework for checking whether payloads requested for storage have been modified prior to storage. The checks may be performed using integrity verification data that is based on corresponding payloads. The payloads and integrity verification data may be generated by an application, and both may be directed to storage. Once received, the storage may perform the checks using the integrity verification data.

20 Claims, 6 Drawing Sheets

SYSTEM AND METHOD FOR MANAGING DATA STORAGE TO IDENTIFY UNDESIRED DATA MODIFICATION

FIELD

Embodiments disclosed herein relate generally to data integrity. More particularly, embodiments disclosed herein relate to systems and methods to manage the integrity of data.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components, and hosted entities such applications, may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
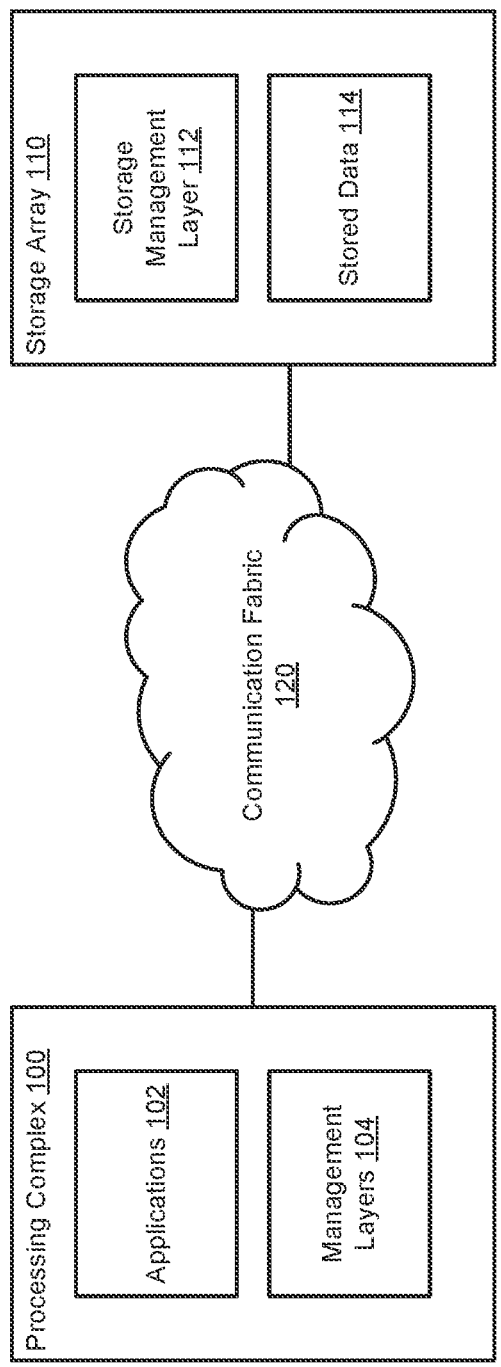
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data storage. When computer implemented services are provided, data may be generated and stored for future use by applications that participate in the computer implemented services.

However, the applications may pass the data to other intermediary entities during transit to storage where the data is stored. In transit, the data may be at risk of being modified due to, for example, action of malicious entities (e.g., ransomware), errors in operation of the intermediary entities, and/or other factors. Consequently, if the modified data is stored without the modifications being identified, the applications my believe that the data is retrievable from storage while the data is not actually retrievable.

To improve the likelihood of data generated by applications being retrievable from storage, the applications may generate integrity verification data for payloads (e.g., data that may be retrieved from storage in the future and used by the application). The integrity verification data may allow for identification of when modifications to the payload have been made after the payload has left possession of the application (e.g., in transit to storage).

When data (that includes both payload and integrity verification data) is obtained by storage arrays or other storage systems, the data may be subjected to a verification processes which checks for signs that the payload and/or integrity verification data has been modified. If it is determined that data has been modified, then a request for storing the data may be refused. By refusing to store the data that is likely to have been modified, an application that requested storage of the data may not be lulled into a false belief that the payload from the data is retrievable from storage in the future.

By doing so, embodiments disclosed herein may improve the likelihood that data generated by applications and sent for storage is retrievable from storage in the future. The disclosed embodiments may do so by adding additional data to a payload usable to identify whether any modifications have been made after the data leaves control of the applications. Thus, embodiments disclosed herein may address, among others, the technical problem of loss of access to data due to malicious or other types of undesired activity in a system.

In an embodiment, a method for managing storage of data is disclosed. The method may include obtaining the data for storage, the data being generated by an application and transmitted to a storage for storage; identifying a first portion of the data corresponding to integrity verification data; performing a verification operation using the first portion of the data corresponding to the integrity verification data to identify an integrity state of a second portion of the data corresponding to a payload; in a first instance of the verification operation where the integrity state indicates that the second portion of the data has not been modified after generation by the application: storing the data in storage to service a request to store the data; and in a second instance of the verification operation where the integrity state indicates that the second portion of the data has modified after generation by the application: rejecting a request to store the data.

The request to store the data may be rejected by issuing a write failure for the data.

Performing the verification operation may include identifying a first sub-portion of the first portion of the data; calculating a one way result for the second portion of the data; making a comparison between the one way result and the first sub-portion; and identifying the integrity state based, at least in part, on an outcome of the comparison.

Performing the verification operation may further include identifying a second sub-portion of the first portion of the data; performing a decryption on the second sub-portion using a public key of a trusted entity to obtain decrypted data; making a first determination regarding whether a copy of the one way result is in the decrypted data; and identifying the integrity state based, at least in part, also on an outcome of the first determination.

Performing the verification operation may also include making a second determination regarding whether a copy of a challenge phrase is in the decrypted data; and identifying the integrity state based, at least in part, additionally on an outcome of the second determination.

The first portion and the second portion may be identified based on a data structure construction schema, the data structure construction schema specifying how integrity verification data generated based on a payload of application data are to be combined to obtain verifiable data.

The one way result may be a hash (e.g., secure hash algorithm 128, 256, 512, etc.) of the payload of the application data generated by the application.

The data may be obtained via a request, the request may be one of multiple requests with each of the multiple requests being for different data, and the request being one of a limited number of the multiple requests being selected for a higher level of screening through the decryption of the second sub-portion with different data of unselected requests of the multiple requests not being subjected to the higher level of screening through the decryption.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, data may be generated and stored for future use. Any type and quantity of data may be generated and stored.

Previously stored data may be used to provide the computer implemented services. For example, if the computer implemented services include database services, then data may be stored for future use to service future requests for information stored as part of the database services. If the data is not accessible in the future, then the computer implemented services may not be available, may not be successfully provided, and/or may otherwise be impacted.

Stored data may be in accessible for a number of different reasons including, for example, activity by a malicious entity. After data is generated and/or routed to storage for retention (e.g., after leaving control of a generator of the data), the malicious entity may modify the data prior to the data being stored. In the context of malware based attacks, the malicious entity may encrypt the data using a secret cypher prior to the now-encrypted data being stored. Consequently, the encrypted data may be stored in place of the intended to be stored data. If read from storage, the data may not be recovered from the encrypted data without the secret cypher. A malicious party may then attempt to extract concessions in exchange for access to the secret cypher to allow recovery of the data from the encrypted data.

In general, embodiments disclosed herein may provide methods, systems, and/or devices for managing storage of data in a manner that improves the likelihood of the data being readable (or otherwise accessible) from storage in the future. To manage the storage of the data, integrity verification data may be added to a payload of data for which access in the future is desired (e.g., to obtain verifiable data). The integrity verification data may be generated and added to the data prior to the data traversing through a system where a malicious entity may interact with the data. For example, the integrity verification data may be added to the payload by an application that also generated the payload of data.

The integrity verification data may include information usable to ascertain whether the payload and/or integrity verification data has been modified after generation by an application. For example, the integrity verification data may include (i) a hash (or other type of one way result to provide a description) of the payload of data, and (ii) an encrypted nonce, message, statement, or other pre-agreed upon portion of data.

When data is obtained by a storage, the storage may attempt to verify that the data has not been modified in transit from the application using integrity verification data that should be included in the data if the data is not modified during transit. For example, the storage may verify (i) that a portion of the data corresponding to where payload data would be stored in verifiable data may be used to generate a hash (or other type of description) that would be included in a second portion of the data where integrity verification data would be stored in verifiable data, and/or (ii) that a third portion of the data (where encrypted data would be located in verifiable data) may be decrypted using a trusted public key to retrieve the nonce, message, statement, or other predetermined portion of data (e.g., agreed upon in advance by the application and storage) which would be present if verifiable data has not been modified in transit from the application. If the hashes match and the predetermined portion of data can be obtained from the encrypted data, then the data may be treated as having been verified.

If received data can be verified by storage, then the data may be stored in the storage for future use (e.g., including the integrity verification data). If the received data cannot be verified by the storage, then the data may not be stored and a write failure may be issued. Issuing the write failure may signal to the application (or other entity requesting storage of data) that the data will not be available in the future thereby prompting the application to take additional action. In addition, when write failures are issued (or sufficient numbers of write failures meeting criteria are issued), alerts or other information may be sent to management entities indicating that a malicious entity may be attempting to interfere with data storage.

By doing so, a system in accordance with an embodiment may be more likely to be able to access stored data in the future by reducing the likelihood that the to-be-stored data is modified while in transit for storage and/or otherwise out of the control of an application for which the data is to-be-stored.

To provide the above noted functionality, the system of FIG. 1 may include processing complex 100 and storage array 110. Each of these components is discussed below.

Processing complex 100 may be implemented with one or more processors (of any type) and memory devices. When operable, processing complex 100 may host any number of entities including, for example, applications 102 and management layers 104.

Applications 102 may contribute to the computer implemented services. For example, applications 102 may perform all, or a portion, of the computer implemented services. During their operation, applications 102 may generate data which may need to be accessed in the future (e.g., payload data).

To improve the likelihood of payload data being retrievable in the future, applications 102 may generate integrity verification data for the payload data and synthesize verifiable data using the integrity verification data and the payload. The verifiable data may be synthesized using a rubric, a set of rules, a template, schema (e.g., a data structure construction schema), or other tool usable to define how verifiable data is generated (e.g., may define the structure, where different portions of data are positioned within the verifiable data, etc.).

Once synthesized, applications 102 may pass the verifiable data to management layers 104 which may manage the storage of the verifiable data in storage array 110. However, during transit from applications 102 to storage array 110 via management layers 104, the verifiable data may be modified by malicious entities such as malware hosted by processing complex 100, or other processing complexes. However, by including integrity verification data in the verifiable data, storage array 110 may identify whether received data has been modified in transit.

Figure 2A:
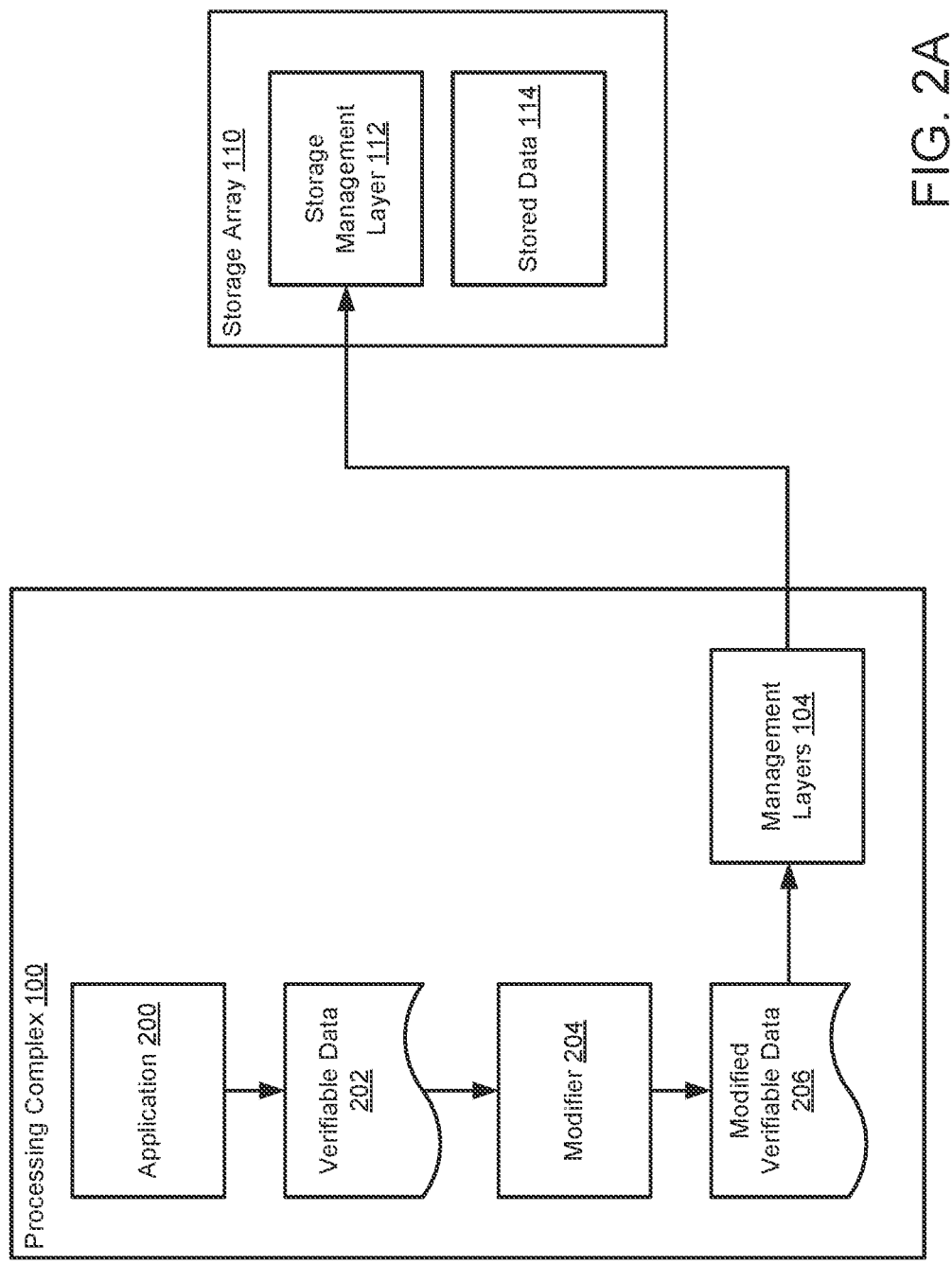
FIGS. 2A-2B show data flow diagrams in accordance with an embodiment.

Management layers 104 may provide management functionality for processing complex 100. For example, management layers 104 may include an operating system and drivers. The operating system and drivers may manage the storage of data on behalf of applications 102 in storage array 110. However, once the data leaves possession of applications 102, malicious entities may modify the data while in custody of management layers 104 through a variety of different types of modalities. If successfully modified by the malicious entities, the data may not be easily recovered from the modified data. For example, if modified data is an encrypted form of the data, then the data may not be recoverable without access to encryption keys used to encrypt the data. Consequently, even if stored, the modified data may not be usable to retrieve the data in the future. Refer to FIG. 2A for additional details regarding modification of data while in transit from applications 200 to storage array 110.

Storage array 110 may be implemented with one or more storage devices (of any type), storage controllers (which may include processors and memory), and/or other devices. Storage array 110 may store for applications 102 and/or other entities.

Figure 2B:
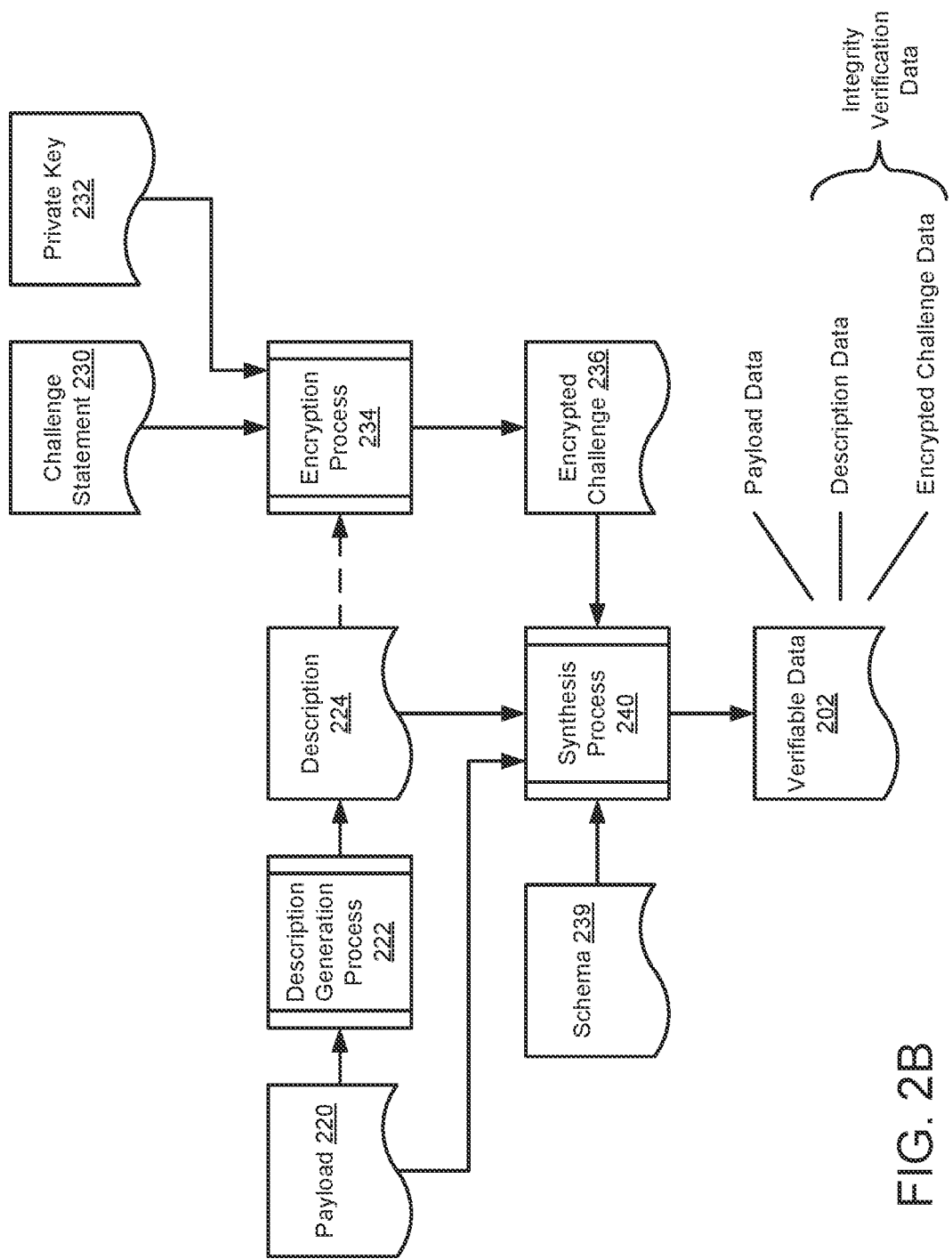

To improve the likelihood of stored data being accessible in the future, storage array 110 may screen data for indications of having been modified while in transit from (or otherwise being out of the control of) applications 102. To do so, storage array 110 may host storage management layer 112 (e.g., an application, embedded software, a function performed by a discrete hardware device, etc.). Storage management layer 112 may perform verifications for data as it is received by storage array 110 for storage. Storage array 110 may presume that the received data conforms to the schema used by applications 102 to generate verifiable data, and may attempt to use integrity verification data from the data to verify the data. Refer to FIG. 2B for additional details regarding generation of verifiable data and verification of data.

If successfully verified, storage management layer 112 may store the data as stored data 114 (e.g., in the storage devices of storage array 110). If the data is unable to be verified, storage management layer 112 may issue a write error for the data thereby notifying applications 102 that the data will not be available in the future. Additionally, storage management layer 112 may send notification and/or other information to management entities. The notification may trigger remediations such as screenings of processing complex 100 for presence of malware or other malicious entities. If detected, the malware may be removed to reduce the likelihood of data being modified while transiting between applications 102 and storage array 110 in the future.

Figure 3A:
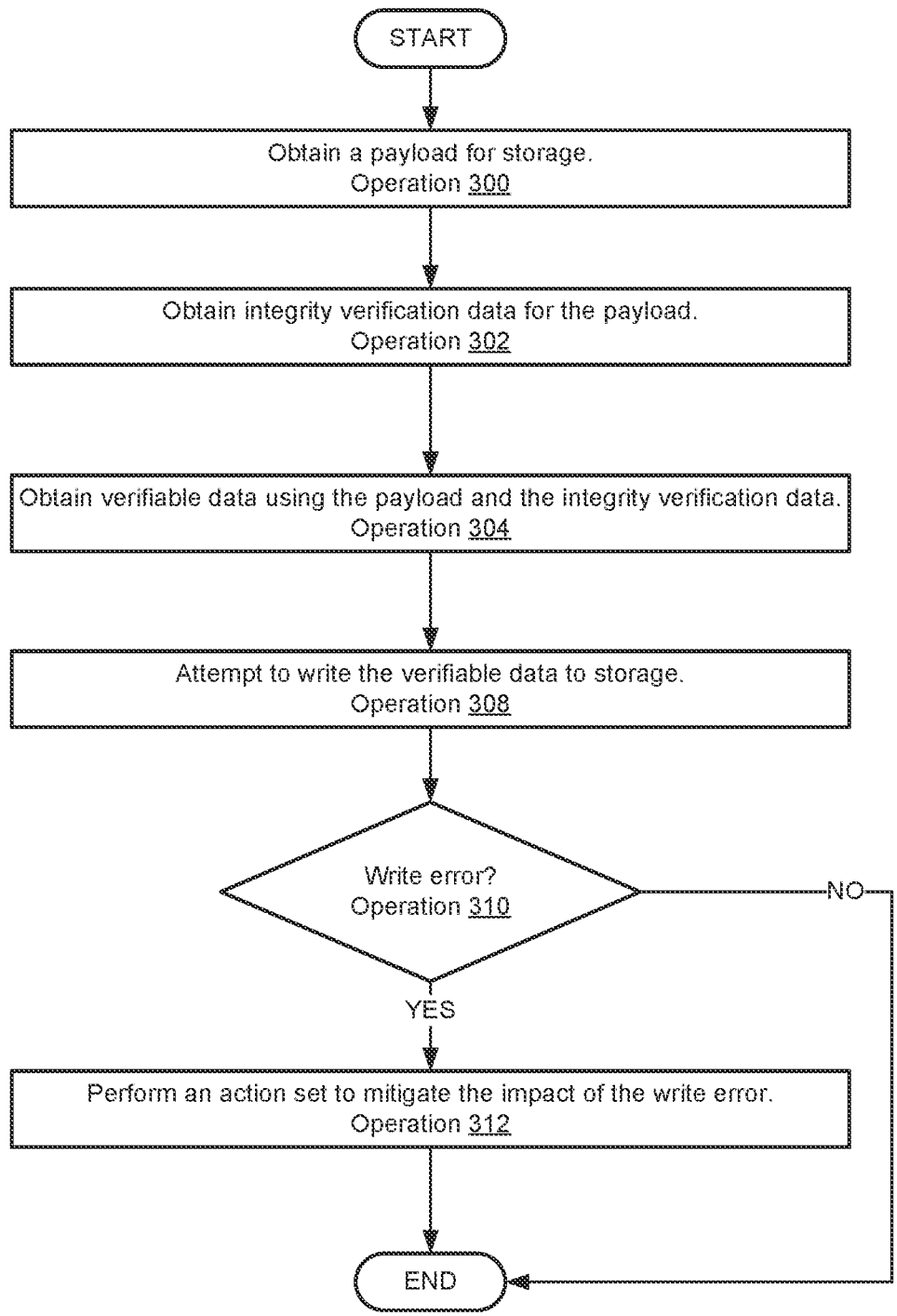
FIGS. 3A-3B show flow diagrams illustrating methods in accordance with an embodiment.
Figure 3B:
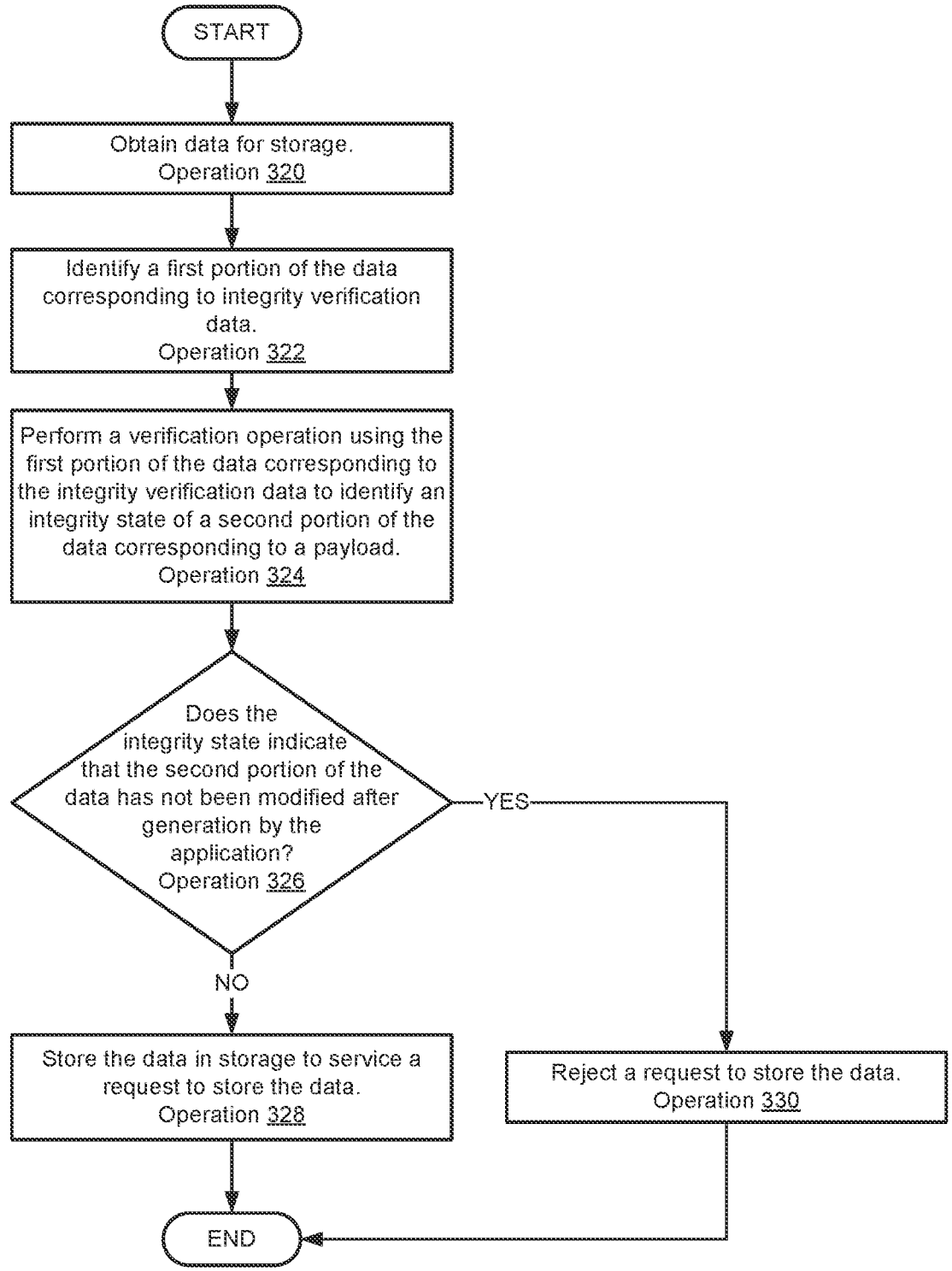

When providing their functionality, any of processing complex 100 and storage array 110 may perform all, or a portion, of the methods illustrated in FIGS. 3A-3B.

Processing complex 100 and storage array 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While described with respect to storage array 110, it will be appreciated that the system of FIG. 1 may include a single storage device which may provide the functionality of storage array 110. Additionally, it will be appreciated that processing complex 100 and storage array 110 may be collocated or separated geographically from one another.

Any of the components illustrated in FIG. 1 may be operably connected to each other (and/or components not illustrated) with communication fabric 120. Communication fabric 120 may facilitate communications between processing complex 100 and storage array 110. In an embodiment, communication fabric 120 includes one or more networks that facilitate communication between any number of components, fiber channel or other types of communication links (e.g., that support Small Computer System Interface (SCSI) based interfaces and data transfer between devices), network interface cards, and/or other types of communication devices. The networks may include wired networks and/or wireless networks (e.g., and/or the Internet). The networks and communication devices may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

As discussed above, a malicious entity may attempt modify data as it is in transit from an application to storage. To reduce the impact of such activity, the system shown in FIG. 1 may generate and use verifiable data to detect modifications of data while in transit.

Turning to FIG. 2A, a first data flow diagram in accordance with an embodiment is shown. In FIG. 2A, entities of a system that may perform activities are shown using a first set of shapes (e.g., 200, 204, 104, 112, 114), and data structures in transit between the entities are shown using a second set of shapes (e.g., 202, 206).

Now, consider an example scenario in which application 200 hosted by processing complex 100 generates data (e.g., a payload) which may need to be accessed in the future. Application 200 may use storage services provided by storage array 110 to store and access the payload.

However, to provide the payload to storage array 110 for storage, application 200 may rely on other entities hosted by processing complex 100 such as management layers 104. Consequently, application 200 may need to pass the payload to any number of intermediate entities before the payload reaching storage array 110. However, the payload may not natively include features to verify its integrity. Accordingly, a malicious entity may modify the content of payload with little chance of the modification being detectable by storage array 110.

To manage the integrity of the payload, application 200 may generate and transmit verifiable data 202 rather than the payload on its own. Verifiable data 202 may include integrity verification data usable to ascertain whether the payload or other portions of verifiable data 202 have been modified after generation by application 200. Refer to FIG. 2B for additional details regarding generation of verifiable data 202.

Once generated, application 200 may pass verifiable data 202 to other entities hosted by processing complex 100, such as management layers 104. However, during transit, modifier 204 may modify the content of verifiable data 202. For example, modifier 204 may represent ransomware, malware, or other types of entities which may modify the content of verifiable data 202. In another example, modifier 204 may represent software that is not malicious but operating in an undesired manner resulting in modification of data in transit between application 200 and storage array 110.

The resulting modified verifiable data 206 due to modifier 204 may, if stored in storage array 110, make the previously generated payload inaccessible. For example, if modifier 204 encrypts verifiable data 202, then the payload as encrypted within the stored copy of modified verifiable data 206 may not be used to recovery the payload within the encryption key (e.g., and/or other types of information used to cypher the payload) used by modifier 204.

However, when modified verifiable data 206 is obtained by storage management layer 112, an integrity verification process may be performed prior to storing modified verifiable data 206 as stored data 114. Because the verification process will fail due to the modification made to verifiable data 202, storage management layer 112 may reject modified verifiable data 206 for storage. Accordingly, application 200 and/or other entities will not rely on a stored copy of modifiable verifiable data 206 in the future for accessing the previously generated payload. Rather, application 200 may interpret the rejection as a write failure, and may take appropriate action (e.g., attempting to perform additional writes, taking other remedial actions, etc.).

Turning to FIG. 2B, a second data flow diagram in accordance with an embodiment is shown. In FIG. 2B, processes that are performed are shown using a first set of shapes (e.g., 222, 234, 240), and data structures are shown using a second set of shapes (e.g., 202, 220, 224, 230, 232, 236, 239).

To obtain verifiable data 202, payload 220 may be ingested by description generation process 222. During description generation process 222, description 224 may be generated. Description 224 may be a portion of data derived, at least in part, on payload 220 and usable to verify whether payload 220 has been modified. For example, description 224 may be a one way result of a one way function with payload 220 as an ingest to the one way function. The one way function may be, for example, a hash function and the one way result may be a hash of payload 220. The hash may be used to ascertain whether payload 220 has been modified by (i) when obtained by a storage array, calculation of another instance of a hash for the payload, and (ii) comparing the other instance of the hash to the hash previously generated by the application (e.g., stored as description 224). If the newly generated other instance of the hash matches the previously generated hash, then description 224 may indicate that payload 220 in the received data has not been modified during transit.

In addition to description 224, encrypted challenge 236 may also be generated and used as a basis for verifiable data 202. Encrypted challenge 236 may be obtained by ingesting challenge statement 230 and private key 232 into encryption process 234. Encryption process 234 may encrypt challenge statement 230 using private key 232.

Challenge statement 230 may be a predetermined statement known to both the application that generated payload and the storage array that will be tasked with storing verifiable data 202. Challenge statement 230 may be provided to the application and the storage array through user input (e.g., enter the challenge statement into a prompt provided by the application and the storage array), through automated distribution process (e.g., once provided to the application, the application may distribute the challenge statement to the storage array via one or more communications), and/or via other methods.

Encryption process 234 may also ingest description 224. Consequently, both description 224 and challenge statement 230 may be included in encrypted challenge 236. The line terminating in an arrow and that extends from description 224 and encryption process 234 is drawn in dashing to indicate that description 224 may not always be included in encrypted challenge 236.

Private key 232 may be part of a key pair trusted by the storage array. The storage array may have access to a corresponding public key for private key 232.

Like description 224, encrypted challenge 236 may be used to ascertain whether payload 220 has been modified by (i) when obtain by a storage array, decrypting encrypted challenge 236 using the public key corresponding to private key 232, (ii) identifying whether the decrypted data includes challenge statement 230, and/or (iii) identifying whether the decrypted data includes a copy of description 224. If a copy of challenge statement 230 and/or description 224 are included in the decrypted data, then encrypted challenge 236 may indicate that payload 220 in the received data has not been modified during transit.

Once description 224 and encrypted challenge 236 are obtained, then verifiable data 202 may be obtained via synthesis process 240. During synthesis process 240, payload, description 224, and encrypted challenge 236 may be arrange in a manner as specified by schema 239. Schema 239 may specify a structure for verifiable data 202. The structure may indicate where payload 220, description 224, and encrypted challenge 236 are to be positioned within verifiable data 202. For example, schema 239 may specify offsets for each of these portions of verifiable data 202, may specify the lengths of each of these portions, etc.

Thus, verifiable data 202 may include different portions corresponding to payload data and integrity verification data. The integrity verification data may include sub-portions corresponding to description data and encrypted challenge data, respectively. The storage array may be aware of schema 239 and may perform integrity checks on data as it is received based on the schema.

For example, when data is received by the storage array, the storage array may automatically extract (or otherwise identify) portions of the data corresponding to where payload data, description data, and encrypted challenge data should be located within the data (e.g., if not modified in transit). The storage array may then perform corresponding portions of the integrity checks on these respective portions (e.g., by attempting to decrypt the encrypted challenge data using the public key and comparing the decrypted data to the challenge statement and/or description data, by attempting to generate a new instance of the description based on the payload data and comparing the new instance to the description data, etc.).

By doing so, a system in accordance with embodiments disclosed herein may identify whether the integrity of data has been compromised after generation by an application.

The functionality (e.g., description generation process 222, encryption process 234, synthesis process 240) shown in FIG. 2B may be performed natively by an application, and/or in an otherwise secure manner (e.g., such as by an add on to base functionality of an application which causes verifiable data based on a payload to be generated prior to storing in memory).

As discussed above, the components of FIG. 1 may perform various methods to verify operations to manage the operation of endpoint devices. FIGS. 3A-3B illustrates a method that may be performed by the components of the system of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method for storing data in storage in accordance with an embodiment is shown. The method may be performed by any of processing complex 100, storage array 110, and/or other components of the system shown in FIG. 1.

At operation 300, a payload is obtained for storage. The payload may be obtained by an application. The application may generate the payload. The payload may be data which the application may need to access in the future to continue to provide computer implemented services.

At operation 302, integrity verification data for the payload is obtained. The integrity verification data may include a description for the payload and an encrypted challenge. The description and encrypted challenge may be obtained as described with respect to FIG. 2B.

At operation 304, verifiable data is obtained using the payload and the integrity verification data. The verifiable data may be obtained by arranging the payload and the integrity verification data as specified by a schema. For example, the schema may specify that the description is to be positioned first, the payload is to be positioned next, and the encrypted challenge is to be positioned last within the verifiable data.

At operation 308, the verifiable data is attempted to be written to storage. The verifiable data may be attempted to be written by invoking functionality of one or more management layers which may cause the verifiable data to transit to a target storage.

However, as noted above, the verifiable data may be modified while in transit, but the included integrity verification data may allow for the target storage to determine whether the verifiable data has been modified after leaving the application. If modified, the target storage may issue a write error which may be provided to the application by the management layers or other entities.

At operation 310, a determination is made regarding whether a write error of the verifiable data has occurred. The determination may be made by obtaining a response from the management layers regarding whether the attempt to write in operation 308 was successful.

If a write error has occurred, then the method may proceed to operation 312. Otherwise the method may end following operation 310.

At operation 312, an action set to mitigate the impact of the write error is performed. The action set may include, for example, attempting the write again (e.g., returning to operation 308), updating a write error counter reflecting the number of times attempts to write the verifiable data to storage have failed, performing other actions based on the write error counter exceeding a threshold, etc.

The other actions may include, for example, issuing an alert, sending notifications to administrators or other persons, etc. The alerts or messages may cause and administrator to initiate review of the processing complex and/or other aspects of a host system by, for example, screening the host system for malicious entities.

The method may end following operation 312.

Using the method shown in FIG. 3A, an application may be less likely to rely on data that is believed to be accessible in storage but is not actually accessible in storage due to modification to the data after leaving possession of the application.

Turning to FIG. 3B, a flow diagram illustrating a method for processing requests to store data in accordance with an embodiment is shown. The method may be performed by any of processing complex 100, storage array 110, and/or other components of the system shown in FIG. 1.

At operation 320, data is obtained for storage. The data may be obtained by receiving it from a processing complex. The data may be being marked for storage on behalf of an application that is known to store verifiable data for storage, rather than mere payloads.

At operation 322, a first portion of the data corresponding to integrity verification data is identified. The first portion may be identified based on a schema used by the application. The schema may specify the location of the first portion within the data.

At operation 324, a verification operation using the first portion of the data corresponding to the integrity verification is performed to identify an integrity state of a second portion of the data corresponding to a payload.

Performing the verification operation may include (i) identifying a first sub-portion of the first portion of the data, (ii) calculating a one way result for the second portion of the data to obtain a description, (iii) making a comparison between the one way result and the first sub-portion; and/or (iv) identifying the integrity state, at least in part, based on an outcome of the comparison. The first sub-portion may also be identified using the schema, and more correspond to a description (e.g., which may include a one way result such as a hash). The one way result may be obtained using a one way function such as a hash function. If the comparison indicates a match, then the security state may indicate that the second portion of the data corresponding to a payload has not been modified. If the comparison indicates a mismatch, then the security state may indicate that the second portion of the data corresponding to the payload has been modified.

Performing the verification operation may also include (i) identifying a second sub-portion of the first portion of the data; (ii) performing a decryption on the second sub-portion using a public key of a trusted entity to obtain decrypted data; (iii) making a first determination regarding whether a copy of the one way result is in the decrypted data; and/or (iv) identifying the integrity state based, at least in part, also on an outcome of the first determination. The second sub-portion may be identified using the schema, and may correspond to an encrypted challenge. If the first determination indicates the copy of the one way result is in the encrypted data, then the security state may indicate that the second portion of the data corresponding to a payload has not been modified. If the first determination indicates the copy of the one way result is not in the encrypted data, then the security state may indicate that the second portion of the data corresponding to the payload has been modified.

Performing the verification operation may additionally include (i) making a second determination regarding whether a copy of a challenge phrase is in the decrypted data; and/or (ii) identifying the integrity state based, at least in part, further on an outcome of the second determination. If the second determination indicates the challenge phrase is in the encrypted data, then the security state may indicate that the second portion of the data corresponding to a payload has not been modified. If the second determination indicates the challenge phrase is not in the encrypted data, then the security state may indicate that the second portion of the data corresponding to the payload has been modified.

In other words, all of the verification integrity data as described with respect to FIG. 2B may need to be verifiable for the second portion of the data corresponding to a payload to be determined as not having been modified after leaving possession of the application.

However, in some cases, only some of the verification integrity data may be verified to ascertain the integrity state of data. To manage computational overhead, only the first sub-portion may be verified for all received data. Periodically, the second sub-portion for various data may also be verified. For example, the second sub-portion may only be verified for one out of a predetermined number of times data is received for storage. The predetermined number may be, for example, 10, 25, 50, 100, etc. The predetermined number may change over time based on the rate at which data is received for storage. For example, as the rate increases, the predetermined number may correspondingly increase to fix the rate at which computing resources are consumed for verifying second sub-portions.

If the integrity state indicates that the second portion of the data has not been modified, then the method may proceed to operation 328. Otherwise, the method may proceed to operation 330.

At operation 328, the data is stored in storage to service a request to store the data. By storing the data (e.g., without removing security data), the data may be accessible in the future and continue to be verifiable.

The data may be stored using data reduction processes such as deduplication, compression, etc. By not encrypting the data prior to receipt by storage, the data may be efficiently deduplicated (e.g., encrypting the payload may limit the efficiency of any deduplication since the content of encrypted data is inconsistent even for similar data when encrypted) without need for decryption prior to deduplication and storage.

The method may end following operation 328.

Returning to operation 330, a request to store the data may be rejected. The request may be rejected by (i) discarding the data without storing it, (ii) issuing notifications indicating that the data has not been stored, (iii) taking remedial action if repeated requests for storage of the same or similar data are rejected (e.g., which may indicate the present of a malicious entity, improper operation of system components, etc.), and/or performing other operations to mitigate the impact of modifications to data from applications. The remedial actions may include, for example, issuing alerts to management entities, sending notifications to administrator, etc. These remedial actions may prompt further investigation and remediation of other issues that may be present in the system, such as presence of ransomware. The remedial actions may trigger automated response (e.g., automatic performance of virus sweeps, suspend operation of various system components, etc.) or manual responses (e.g., cause an administrator to review operation of the system).

The method may end following operation 330.

Using the method shown in FIG. 3B, embodiments disclosed herein may facilitate identification of modified data and proactive action to manage the impacts of the modifications to the data. The impacts may be modified by reducing the likelihood of undue reliance of the modified data in the future.

Figure 4:
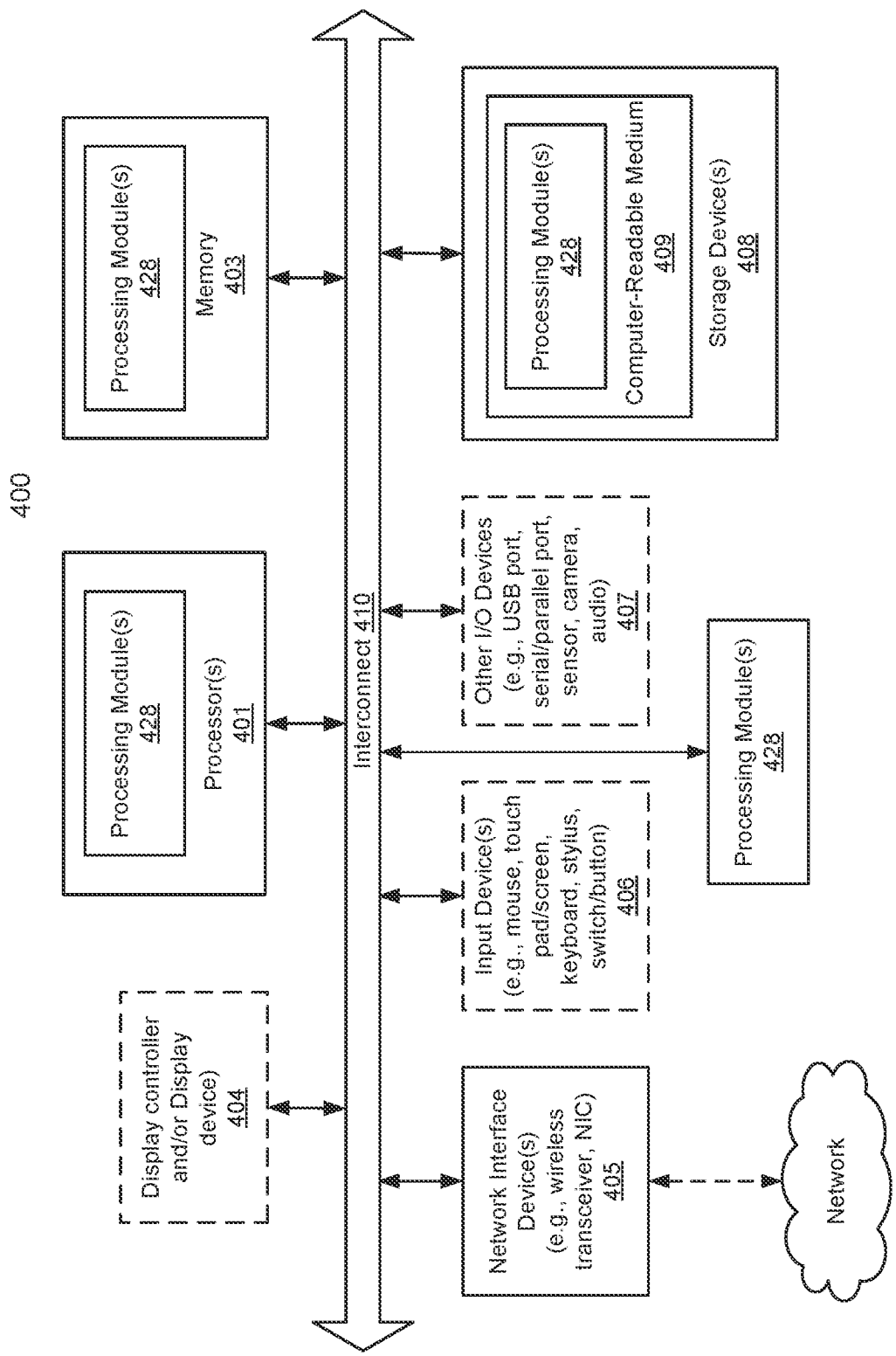
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing storage of data, the method comprising:
   obtaining the data for storage, the data being associated with a first entity and generated by an application hosted by a computing device associated and transmitted by the computing device to a storage for storage;
   identifying a first portion of the data corresponding to integrity verification data;
   performing a verification operation using the first portion of the data corresponding to the integrity verification data to identify an integrity state of a second portion of the data corresponding to a payload;
   in a first instance of the verification operation where the integrity state indicates that the second portion of the data has not been modified by the computing device without knowledge of the first entity after being generated by the application and before being transmitted to the storage:
      storing the data in storage to service a request to store the data; and
   in a second instance of the verification operation where the integrity state indicates that the second portion of the data has been modified after generation by the application:
      rejecting a request to store the data.

2. The method of claim 1, wherein performing the verification operation comprises:
   identifying a first sub-portion of the first portion of the data;
   calculating a one way result for the second portion of the data;
   making a comparison between the one way result and the first sub-portion; and
   identifying the integrity state based, at least in part, on an outcome of the comparison.

3. The method of claim 2, wherein performing the verification operation further comprises:
   identifying a second sub-portion of the first portion of the data;
   performing a decryption on the second sub-portion using a public key of a trusted entity to obtain decrypted data;
   making a determination regarding whether a copy of the one way result is in the decrypted data; and
   identifying the integrity state based, at least in part, also on an outcome of the determination.

4. The method of claim 3, wherein the data is obtained via a request, the request is one of multiple requests with each of the multiple requests being for different data, and the request being one of a limited number of the multiple requests being selected for a higher level of screening through the decryption of the second sub-portion with different data of unselected requests of the multiple requests not being subjected to the higher level of screening through the decryption.

5. The method of claim 2, wherein the one way result is a hash of the payload of the application data generated by the application.

6. The method of claim 2, wherein the one way result is an irreversible function comprising a hash of the payload.

7. The method of claim 1, wherein performing the verification operation comprises:
   identifying a sub-portion of the first portion of the data;
   performing a decryption on the sub-portion using a public key of a trusted entity to obtain decrypted data;
   making a determination regarding whether a copy of a challenge phrase is included in the decrypted data; and
   identifying the integrity state based, at least in part, additionally on an outcome of the determination.

8. The method of claim 1, wherein the first portion and the second portion are identified based on a data structure construction schema stored in the storage, the data structure construction schema being stored in the storage before the data is obtained by the storage and specifies how integrity verification data generated based on a payload of application data are to be combined to obtain verifiable data.

9. The method of claim 1, wherein performing the verification operation comprises:
calculating a one way result for the second portion of the data;
identifying a sub-portion of the first portion of the data;
performing a decryption on the sub-portion using a public key of a trusted entity to obtain decrypted data;
making a determination regarding whether a copy of the one way result is included in the decrypted data; and
identifying the integrity state based on an outcome of the determination.

10. A non-transitory machine-readable medium having instructions stored therein, which when executed by a processor, cause the processor to perform operations for managing storage of data, the operations comprising:
obtaining data for storage, the data being generated by an application hosted by a computing device and transmitted by the computing device to a storage for storage;
identifying a first portion of the data corresponding to integrity verification data;
performing a verification operation using the first portion of the data corresponding to the integrity verification data to identify an integrity state of a second portion of the data corresponding to a payload;
in a first instance of the verification operation where the integrity state indicates that the second portion of the data has not been modified by the computing device after being generated by the application and before being transmitted to the storage; and
in a second instance of the verification operation where the integrity state indicates that the second portion of the data has been modified after generation by the application:
rejecting a request to store the data.

11. The non-transitory machine-readable medium of claim 9, wherein performing the verification operation comprises:
identifying a first sub-portion of the first portion of the data;
calculating a one way result for the second portion of the data;
making a comparison between the one way result and the first sub-portion; and
identifying the integrity state based, at least in part, on an outcome of the comparison.

12. The non-transitory machine-readable medium of claim 11, wherein performing the verification operation further comprises:
identifying a second sub-portion of the first portion of the data;
performing a decryption on the second sub-portion using a public key of a trusted entity to obtain decrypted data;
making a first determination regarding whether a copy of the one way result is in the decrypted data; and
identifying the integrity state based, at least in part, also on an outcome of the first determination.

13. The non-transitory machine-readable medium of claim 12, wherein performing the verification operation further comprises:
making a second determination regarding whether a copy of a challenge phrase is in the decrypted data; and
identifying the integrity state based, at least in part, additionally on an outcome of the second determination.

14. The non-transitory machine-readable medium of claim 13, wherein the first portion and the second portion are identified based on a data structure construction schema, the data structure construction schema specifying how integrity verification data generated based on a payload of application data are to be combined to obtain verifiable data.

15. The non-transitory machine-readable medium of claim 14, wherein the one way result is a hash of the payload of the application data generated by the application.

16. The non-transitory machine-readable medium of claim 12, wherein the data is obtained via a request, the request is one of multiple requests with each of the multiple requests being for different data, and the request being one of a limited number of the multiple requests being selected for a higher level of screening through the decryption of the second sub-portion with different data of unselected requests of the multiple requests not being subjected to the higher level of screening through the decryption.

17. A system, comprising:
a processor; and
a memory coupled to the processor to store instructions, which when executed by the processor, cause the processor to perform operations for managing storage of data, the operations comprising:
obtaining data for storage, the data being generated by an application hosted by the system and transmitted by the system to a storage for storage;
identifying a first portion of the data corresponding to integrity verification data;
performing a verification operation using the first portion of the data corresponding to the integrity verification data to identify an integrity state of a second portion of the data corresponding to a payload;
in a first instance of the verification operation where the integrity state indicates that the second portion of the data has not been modified by the system after being generated by the application and before being transmitted to the storage:
storing the data in storage to service a request to store the data; and
in a second instance of the verification operation where the integrity state indicates that the second portion of the data has been modified after generation by the application:
rejecting a request to store the data.

18. The system of claim 17, wherein performing the verification operation comprises:
identifying a first sub-portion of the first portion of the data;
calculating a one way result for the second portion of the data;
making a comparison between the one way result and the first sub-portion; and
identifying the integrity state based, at least in part, on an outcome of the comparison.

19. The system of claim 18, wherein performing the verification operation further comprises:
identifying a second sub-portion of the first portion of the data;
performing a decryption on the second sub-portion using a public key of a trusted entity to obtain decrypted data;

making a first determination regarding whether a copy of the one way result is in the decrypted data; and identifying the integrity state based, at least in part, also on an outcome of the first determination.

20. The system of claim 19, wherein performing the verification operation further comprises:

making a second determination regarding whether a copy of a challenge phrase is in the decrypted data; and identifying the integrity state based, at least in part, additionally on an outcome of the second determination.

* * * * *

UNITED STATES PATENT AND TRADEMARK OFFICE
CERTIFICATE OF CORRECTION

PATENT NO. : 12,204,767 B2  
APPLICATION NO. : 18/299919  
DATED : January 21, 2025  
INVENTOR(S) : Chao et al.

Page 1 of 1

It is certified that error appears in the above-identified patent and that said Letters Patent is hereby corrected as shown below:

In the Claims

Claim 11, Column 17, Line 44, the word "claim 9" should read -- claim 10 --.

Signed and Sealed this  
Eleventh Day of March, 2025

Coke Morgan Stewart  
*Acting Director of the United States Patent and Trademark Office*